United States Patent [19]

Deters et al.

[11] Patent Number: 5,504,278
[45] Date of Patent: Apr. 2, 1996

[54] APPARATUS AND METHOD FOR WEIGHING TEXTILE PACKAGES

[75] Inventors: August L. Deters, Remscheid; Udo Teich, Sprockhövel; Frank Adenheuer, Wuppertal; Martin Broich, Remscheid, all of Germany

[73] Assignee: Barmag AG, Remscheid, Germany

[21] Appl. No.: 150,964

[22] Filed: Nov. 12, 1993

[30] Foreign Application Priority Data

Nov. 12, 1992 [DE] Germany .................. 42 38 160.6

[51] Int. Cl.$^6$ .................. G01G 19/00; G01G 23/00
[52] U.S. Cl. .................. 177/145; 177/151; 177/229; 177/245; 177/253; 242/35.5 A; 242/131
[58] Field of Search .................. 177/132, 144, 177/145, 146, 151, 152, 161, 211, 229, 245, 253, 255, 50, 52, 53, 119; 242/131, 36, 35.5 A

[56] References Cited

U.S. PATENT DOCUMENTS

| Re. 31,839 | 2/1985 | Schippers et al. | 242/35.5 A |
| 4,340,187 | 7/1982 | Schippers et al. | 242/35.5 A |
| 4,351,494 | 9/1982 | Schippers et al. | 242/35.5 A |

*Primary Examiner*—Peter S. Wong
*Assistant Examiner*—Randy W. Gibson
*Attorney, Agent, or Firm*—Bell, Seltzer, Park & Gibson

[57] ABSTRACT

An apparatus for weighing full yarn packages which are supported on a transport unit which moves along a trackway in the textile plant. The weighing apparatus includes a weighing station which is positioned at a fixed location along the path of travel of the transport unit, and the weighing station temporarily supports the weight of each package on the transport unit and so as to permit the weight of each package to be sensed.

14 Claims, 3 Drawing Sheets

APPARATUS AND METHOD FOR WEIGHING TEXTILE PACKAGES

BACKGROUND OF THE INVENTION

The present invention relates to a method and apparatus for weighing packages of the type comprising a hollow winding tube having yarn or similar material wound thereupon.

A weighing apparatus of the described type is disclosed in DE OS 29 45 861 and corresponding U.S. Patent RE 31,839. The weighing apparatus disclosed therein is used for the quality control of full yarn packages in a continuous spinning process, and they continuously register the weights of the fully wound yarn packages and input the same via a suitable evaluation circuit to a control unit, which readjusts the necessary control parameters, if need arises, so as to ensure a uniformly high quality.

In accordance with the known weighing apparatus, the measured weighing data are transmitted via so-called tow lines to a process computer, the tow lines being needed so as to obtain the necessary freedom of movement for the package transport units. A requirement for this system is that the package transport units are adapted for traveling only in a reciprocal movement, and for this reason, it is necessary always to have all package transport units move in a uniform direction, so as to preclude a mutual interference.

It is possible, however, to provide without any difficulties a multitrack package transport system, it being necessary that each of the individual tracks have a forward and a return track, so as to be able to operate several package transport units at the same time. This alternative would involve a significant cost, and in addition, the requirements to be met by modern spinning systems with independent time cycles for each spinning machine, control station and, possibly, temporary storage, will not as a practical matter allow such solutions.

Furthermore, while it is conceivable to have the package transport units travel independently of one another via a radio control system, the problem arises that it is necessary to select a separate frequency for each package transport unit, so as to avoid having the radio signals of the individual package transport units interfere with one another.

It is accordingly an object of the present invention to provide an improved weighing apparatus of the described type which is able to achieve a high weighing throughput in an economical manner, with small space requirements, and irrespective of the preset time cycles of individual production areas of the spinning system.

SUMMARY OF INVENTION

The above and other objects and advantages of the present invention are achieved in accordance with the embodiments disclosed herein, by the provision of a method and apparatus which comprises a trackway defining a path of travel, and a package transport unit mounted to the trackway for movement along the path of travel. The package transport unit has at least one horizontally disposed support mandrel for receiving and supporting the winding tube of a package thereupon, and means are provided for selectively retaining the package transport unit at a predetermined weighing location along the path of travel. A weighing station is positioned at a fixed location along the path of travel adjacent the weighing location, and the weighing station has at least one horizontally disposed weighing mandrel which is horizontally aligned with the support mandrel when the package transport unit is positioned at the weighing location. Means are provided for selectively moving the weighing mandrel forward and back in a horizontal direction, and up and down in a vertical direction, and means are provided for sensing a deflection of the weighing mandrel caused by a weight being applied thereto and for generating a signal in response to such deflection.

In operation, and with the package transport unit being positioned at the weighing location, the weighing mandrel may be moved horizontally into the winding tube of a package which is supported by the support mandrel, and the weighing mandrel then may be moved vertically to lift the package from the support mandrel. The weight of the package then may be determined from the deflection signal.

An important feature of the present invention is that for a plurality of package transport units only a single weighing station is necessary, which fully satisfies all weighing functions.

Also, with the present invention, it is possible to have the package transport units move along a closed circular path, which has not been possible with the known devices, since otherwise the tow lines become twisted in the course of time.

A further advantage of the present invention resides in the fact that the package transport units are able to cover paths of any desired length, since they are no longer tied to the tow lines.

In the preferred embodiment, the weighing mandrels each comprise a cantilevered bar, and the sensing means comprises a strain gauge mounted on each bar. This construction provides the advantage of a troublefree mode of operation for the weighing mandrels, with a high degree of accuracy. A further advantage resulting from this construction lies in the fact that a full package can be received by the weighing mandrels without contacting the yarn body, so that any impairment of the outer layers of the yarn body is precluded.

The present invention utilizes the fact that the weighing mandrels, when loaded by the full yarn packages, undergo an adequately great flexure, so as to obtain adequately high output signals with conventional strain gauges on the basis of ohmic resistances.

Should the dimensioning of the weighing mandrels result in the output signals being low, it is possible to use semiconductor strain gauges, if the need arises.

In a typical installation, each package transport unit comprises a plurality of the support mandrels which are disposed in a horizontally and vertically spaced apart pattern, and the weighing station comprises a plurality of weighing mandrels which are disposed in a corresponding pattern. This permits a plurality of full yarn packages to be simultaneously checked, and with the preset production sequence remaining unchanged.

This also means that the plurality of package support mandrels receive the full packages each time in a certain order, which ensures a clear association of the full packages to the producing yarn winding apparatus. Thus, in the event of quality losses, a clear followup of the product allows the yarn winding apparatus or winding position on which the rejected full package was produced to be determined, so as to permit a controlled readjustment of the respective operating parameters at this winding position.

The weighing station preferably includes a common carriage for all of the weighing mandrels, which further allows the weighing operation to be performed simultaneously for almost any desired number of full packages.

It is preferable that each of the weighing mandrels be provided with a separate one of the sensors, inasmuch as this construction enables a comparison of qualities of individual winding positions with respect to each other.

It sometimes happens that the measuring accuracy of the weighing mandrels is subject to drift after operation over an extended period of time, such as several weeks. To correct for this contingency, a calibration station may be positioned along the path of travel at a fixed location adjacent the weighing location. The calibration station comprises a calibrating weight for each of the weighing mandrels, and the calibrating weights are supported for movement between a withdrawn position and an operative position where each weight may be engaged by one of the weighing mandrels. This configuration offers the possibility of calibrating the weighing apparatus at any time, so as to make sure that a constant quality is produced over a long period of time.

Each support mandrel is preferably of a generally U-shaped configuration when viewed in transverse cross-section, and each weighing mandrel is also of U-shaped cross-sectional configuration and is sized to be received within a support mandrel. This provides the advantage that the transfer of the full packages from the support mandrels to the weighing mandrels and likewise their return can proceed without damaging the inside surface of the winding tube, since the winding tube will always be located either only on the support mandrel or only on the weighing mandrel. This arrangement offers the further advantage that after the transfer to the weighing mandrel, an oscillatory movement of the often heavy full package is basically precluded, since the inner regions of the winding tube always rest upon the two parallel legs of the U in a defined stable equilibrium and free of oscillations. This in turn allows the measuring accuracy to be assured without any additional means for damping the oscillatory motion.

The trackway preferably comprises an overhead conveyor, and the package transport unit includes a hanger which is dependingly supported from the conveyor. This provides the advantage of an accurate positioning of the support mandrels in front of the weighing mandrels, so that a repositioning, for example, by a control circuit may not become necessary.

The means for selectively retaining the package transport unit at the weighing location may constitute a brake pad which engages the hanger of the unit, or it may constitute a cylinder which lifts the unit from the conveyor and into engagement with a fixed guide.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENTS

Figure 2:
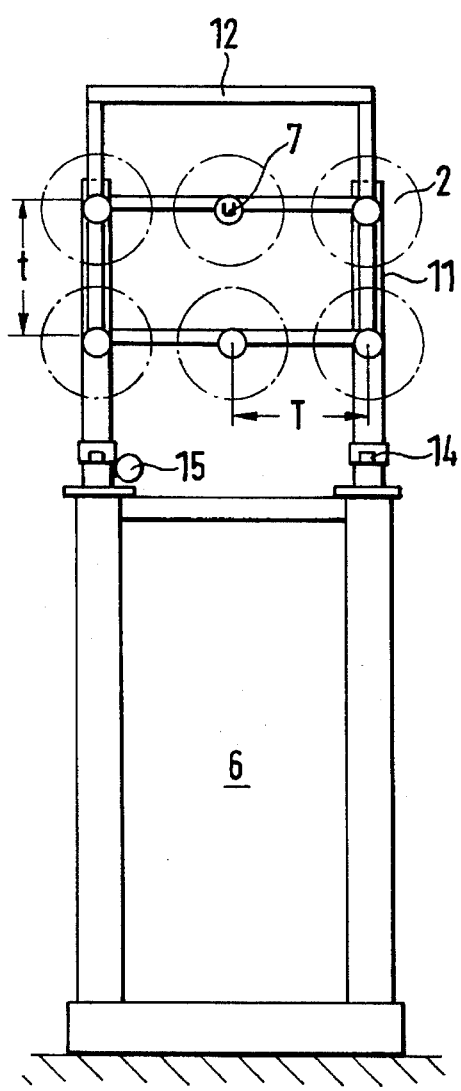
FIG. 2 is a side elevational view of the apparatus of FIG. 1, when viewed transversely to the direction of advance.

Shown in the Figures is a weighing apparatus 1 for full yarn packages 2 wound on winding tubes 9. These full packages 2 are wound with synthetic filament yarns, filaments, tapes, foils or other materials in the form of webs or filaments, most commonly, however, with synthetic filament yarns.

The full packages 2 are moved on horizontally projecting package support mandrels 5 by means of a package transport unit 3 along a package conveyor track 4. To this end, the package conveyor track 4 may be arranged, for example, between the front of a yarn winding apparatus and a temporary package storage, in which the continuously produced packages are temporarily stored, until they are needed for further processing.

One feature of the invention is that the weighing apparatus 1 is in the form of a weighing station 6 which is stationarily arranged along one side of the path of travel defined by the package conveyor track 4. The weighing station 6 is provided with weighing mandrels 7, which are adapted for movement to an aligned position with respect to the package support mandrels 5 and for entering in this position into winding tubes 9 and being raised in this entered position.

The aligned position of weighing mandrels 7 with package support mandrels 5 is indicated by a generally horizontal line 8, whereas a generally vertical lifting movement of the weighing mandrels permits the full packages 2 to be weighed in the manner further described below.

After the package transport unit 3 has moved to the illustrated weighing location, it is secured therein such that the package support mandrels 5 are located with their free ends disposed oppositely to respective ones of the weighing mandrels 7, and so as to permit the latter to enter into the winding tubes 9 of the full packages 2, and thereby temporarily remove them from the package support mandrels 5 for weighing.

Figure 4:
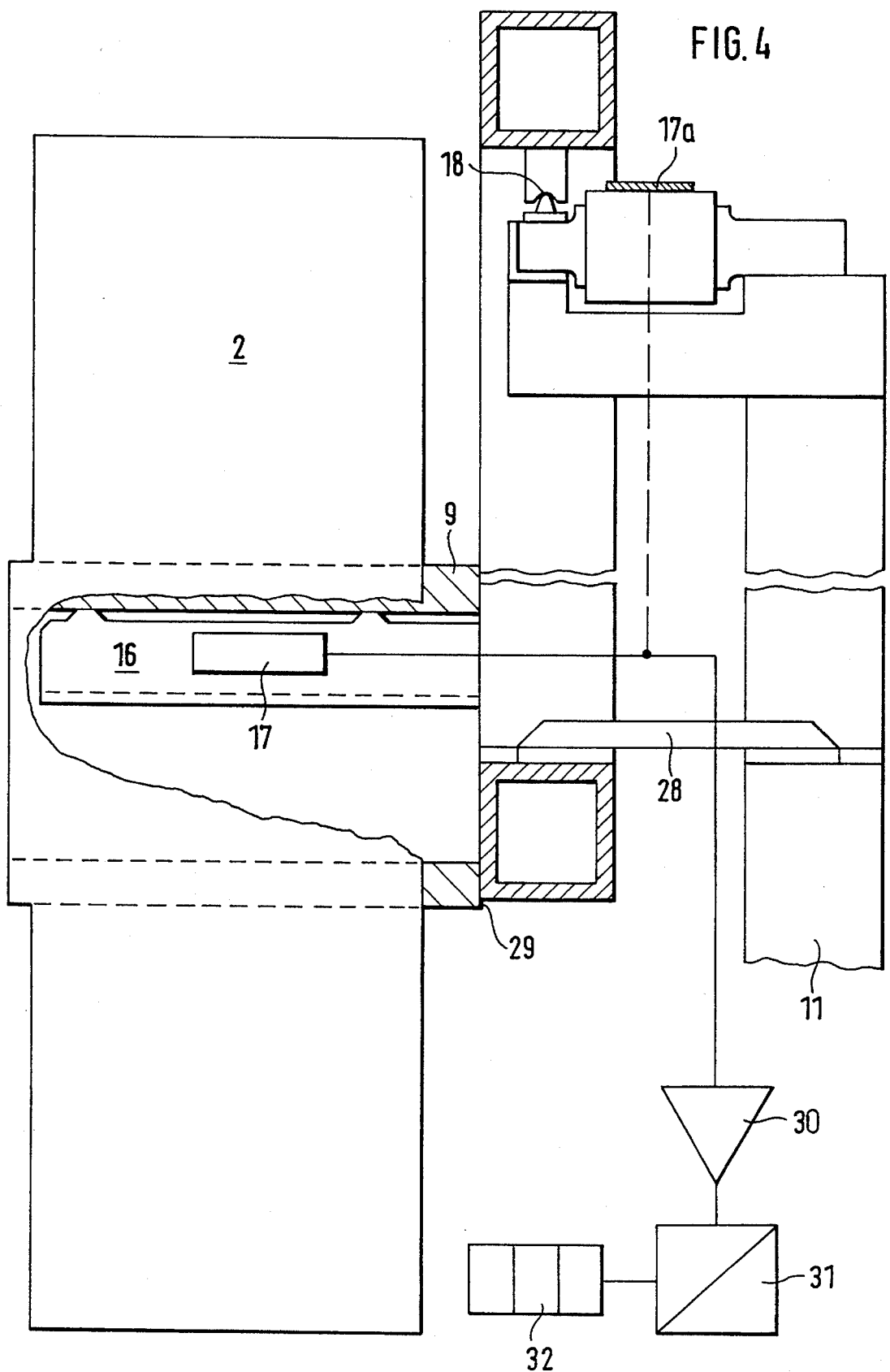
FIG. 4 is a fragmentary and partly sectioned view of the weighing mandrel during the weighing operation.

As best seen in FIG. 4, the weighing mandrels 7 may be designed and constructed as cantilevered bars 16 which are suitably provided with strain gauges 17, and so as to pick up in accordance with conventional technology, the deformation of bars 16 caused by the weight of the full packages 2.

The output signal of each strain gauge 17 is input to a suitable evaluation circuit, so as to be able to determine the weight of the full package 2 from the flexure of the bar 16. The evaluation circuit is shown schematically in FIG. 4 and comprises a measuring amplifier 30, an A-D converter 31, as well as a display 32 or the like. These circuit components are conventional and therefore are not described in more detail.

Figure 1:
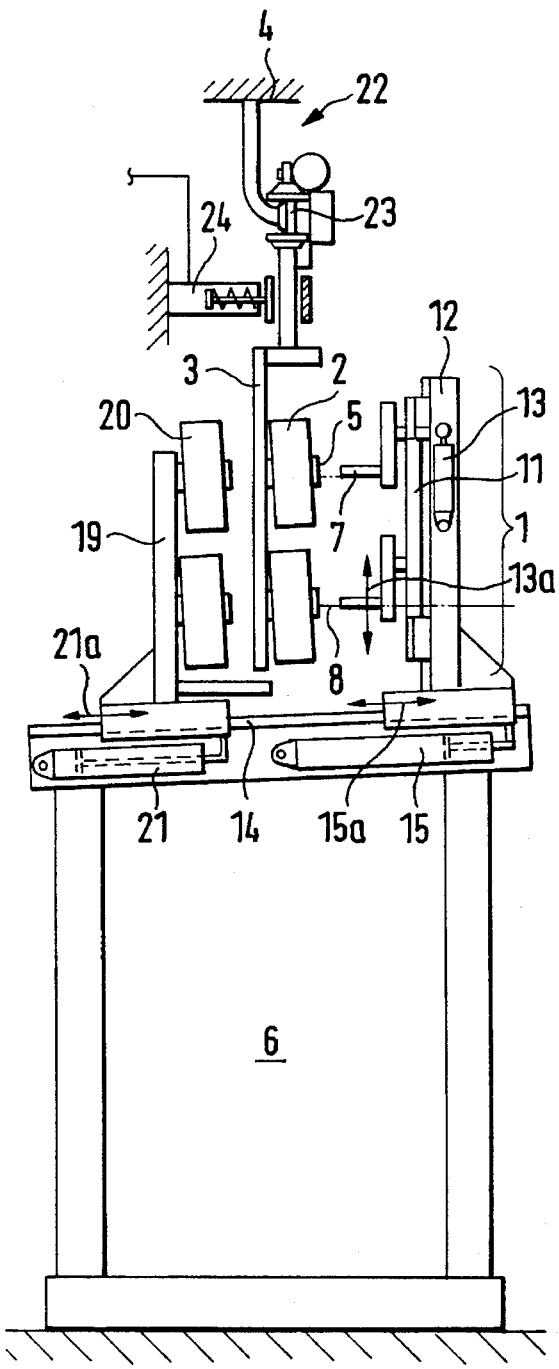
FIG. 1 is a front elevational view of a weighing apparatus in accordance with the invention, when viewed from the direction of advance.

As seen in particular in FIGS. 1 and 2, it may be useful to provide each package transport unit 3 with a plurality of package support mandrels 5, which are spaced apart from one another at a preset, horizontal gauge T and/or vertical gauge t, and to associate to each package support mandrel 5 a weighing mandrel 7, the latter being arranged preferably on a common carriage 11, which is adapted for horizontal and vertical movements.

To this end, the carriage 11 is supported on a frame 12 and connected to a piston-cylinder unit The piston-cylinder unit 13 may cause carriage 11 to perform on frame 12 upward and downward movements as indicated at 13a, so as to move the weighing mandrels 7 to the aligned position (alignment 8) with package transport mandrels 5.

In the position illustrated in FIG. 1, the carriage 11 with weighing mandrels 7 has just been aligned with package support mandrels 5, and in position to be moved toward the full packages 2. A guideway 14 extending in a horizontal plane is provided, along which frame 12 is able to move in a direction toward or away from the package transport unit 3.

For the drive, a cylinder-piston unit 15 is used, which is attached on the one hand to stationary weighing station 6, and on the other hand to frame 12, so as to move the latter along guideway 14.

As can clearly be noted, the plane of guideway 14 is slightly inclined in a direction toward the package transport unit 3, so that during movement of weighing mandrels 7 in a direction toward package support mandrels 5, it is necessary to undergo a slight lowering component of the weighing mandrels 7.

Likewise, it is to be noted that the central radial plane of the full packages 2 has been inclined counterclockwise by substantially the same angle, whereby substantially a right angle results between the central radial plane of full packages 2 and the direction of movement along guideway 14. The inclination of the full packages 2 provides that even when the package transport unit 3 travels along "sharp curves" in the path of travel, the full packages will be unable to slide from package support mandrels 5.

The reciprocal movement of frame 12 is indicated at numeral 15a. As is further shown in FIG. 4, the cantilevered bar 16 may be supported with respect to carriage 11 on a knife-edge bearing 18, so as to enable a frictionfree support for cantilevered bar 16. A possibly occurring pendulating movement is damped or prevented by a guideway 28, which is located between carriage 11 and movable components of the weighing device.

Still further shown in FIG. 4 is that either as an alternative to providing strain gauge 17 on the bar 16, or in addition thereto, the knife-edge bearing 18 may be arranged on a weighing element, the deformation of which is picked up by strain gauge 17a and evaluated in known manner per se.

A stop 29 is positioned to engage the end of the tube 9 and provide for a defined position of the full package with respect to the weighing device.

As further shown in FIG. 1, the weighing station 6 may be provided with a frame 19 carrying calibration weights 20, provided in an arrangement corresponding to the arrangement of the full packages 2 on package transport unit 3, and which can be transferred to the weighing mandrels 7 in place of full packages 2.

To this end, frame 19 is mounted for movement along guideway 14 and is positioned on the side of the path of travel defined by the trackway 4 which is opposite that of the weighing station 1. The frame 19 is able to be moved with a piston-cylinder unit 21 in the direction of traveling movements 21a.

It is easy to visualize that the frame 19 with calibration weights 20 may be used instead of package transport unit 3, so as to load from time to time the calibration weights onto the weighing mandrels 7.

Since the weight of the calibration weights is always constant, it is thus possible to easily check the measuring and evaluation circuit of weighing sensors 17 for the presence of a drift, and so as to permit their recalibration.

Figure 3:
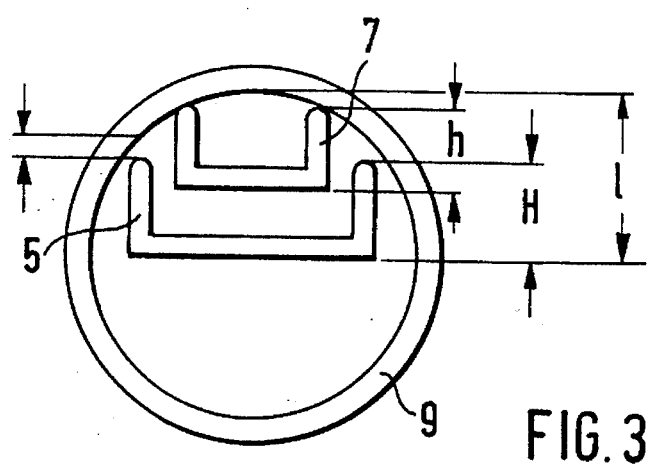
FIG. 3 is a fragmentary end view of a full package showing both the support mandrel and the weighing mandrel within the winding tube of the package, and during an upward or downward movement.

As can further be noted from FIG. 3, the package support mandrels 5 are designed and constructed as an upwardly open U, and the maximal height h of weighing mandrels 7 is less than the inside height 1 between the crossbar of the U and the inside wall of winding tube 9.

In this manner, it can be accomplished that the weighing mandrel 7 is able to enter into winding tube 9 without contacting package support mandrel 5, so that upon reaching its entered position, the weighing mandrel 7 is able to lift the tube 9 from the package support mandrel 5.

As one will note, the contact between the package support mandrel 5 or the weighing mandrel 7 and the inside wall of winding tube 9 occurs along two lines of contact, which are located above the center of gravity of the full package being in centric relationship with the winding tube, so as to provide thereby an always satisfactory, stable position of equilibrium, which avoids a pendulating motion of the received full package and its winding tube.

As can further be noted from the embodiment of FIG. 3, it may be useful to provide the weighing mandrels 7 likewise with the cross section of an upwardly open U.

Figure 5:
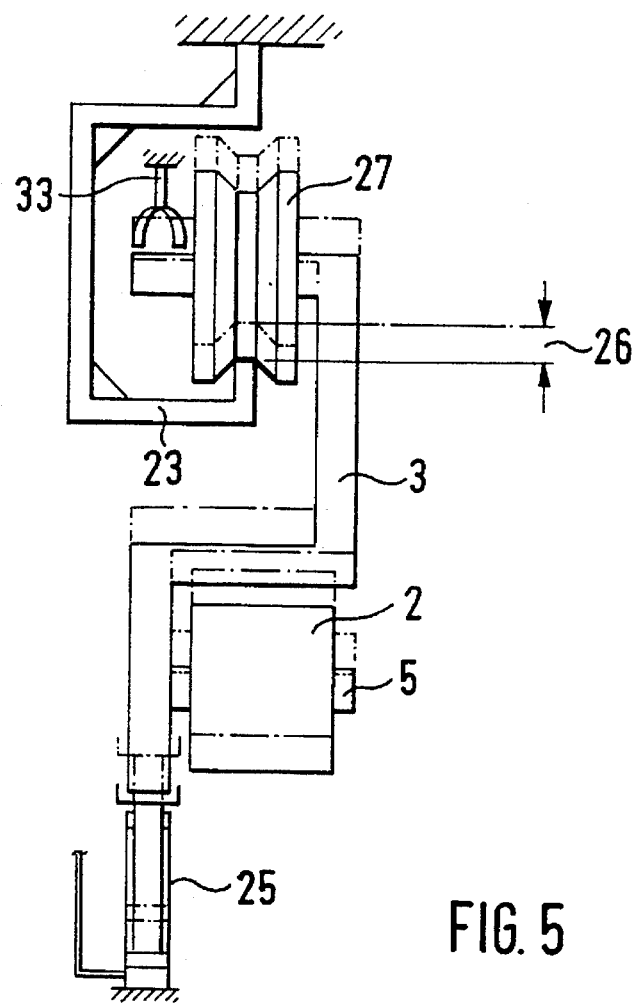
FIG. 5 is a fragmentary view of the package transport unit with a lifting cylinder for retaining the unit at the weighing location.

In the illustrated embodiment, and as can be noted from FIGS. 1 and 5, the transport unit 3 with package conveyor track 4 is designed and constructed as an overhead conveyor system 22, which is in the form of a monorail conveyor system 23. In the region of weighing station 6 a stopping device 24 is provided, so as to secure the positioned package transport unit 3 at the weighing location.

The stopping device 24, as shown in FIG. 1, is a brake engaging both sides of the package transport unit 3, whereas FIG. 5 illustrates an embodiment, in which the stopping member is constructed as a lifting cylinder 25, which lifts the package transport unit to a position so as to engage a guide 33 and provide a contact-preventing air gap 26 between a conveyor carriage roller 27 and its associated track 23.

In operation, the traveling package transport unit 3 is stopped in the region of weighing station 6, where full packages 2 are transferred contact free with respect to the package surface to weighing mandrels 7 for the weighing operation, and subsequently returned to the package transport unit 3.

To this end, the package transport unit 3 is stopped at a weighing location at which the package support mandrels 5 are aligned along the line 8 with the weighing mandrels 7, so that the weighing mandrels 7 are able to move into the package tubes 9, and temporarily lift the full packages 2 from support mandrels 5 with an upward movement.

The weighing mandrels 7 thus support the weight of full packages 2, and after the weighing, return the full packages 2 to package support mandrels 5 with a downward movement. Thereafter, the weighing mandrels 7 move out of the winding tubes 9 and so that the package transport unit 3 is able to continue its travel. This operation repeats itself upon arrival of the next package transport unit 3 at weighing station 6.

If need arises, the package transport unit 3 may be secured with respect to the package conveyor 4 by one of the above described measures, when the package support mandrels 5 are aligned with the weighing mandrels 7 along the line 8.

To calibrate the weighing mandrels 7 or weighing sensors 17, a set of calibration weights 20 is provided which are placed either at regular time intervals or randomly onto weighing mandrels 7 and in the place of full packages 2. The outputs of the sensors may then be calibrated if necessary to provide a correct output.

In the specification, typical preferred embodiments of the invention have been disclosed and, although specific terms have been employed, they have been used in the generic and descriptive sense only and not for purposes of limitation, the scope of the invention being set forth in the following claims.

That which is claimed is:

1. An apparatus for transporting and weighing packages which comprise a hollow winding tube having a material wound thereupon, said apparatus comprising a trackway defining a path of travel, a package transport unit mounted to said trackway for movement along said path of travel, and comprising at least one horizontally disposed support mandrel for receiving and supporting the winding tube of a package thereupon, means for selectively retaining said package transport unit at a predetermined weighing location along said path of travel, a weighing station positioned at a fixed location along said path of travel adjacent said weighing location, and comprising at least one horizontally disposed weighing mandrel which is horizontally aligned with said one support mandrel when said package transport unit is positioned at said weighing location, and means for selectively moving said weighing mandrel forward and back in a horizontal direction and up and down in a vertical direction, and means for sensing a deflection of said one weighing mandrel caused by a weight being applied thereto and for generating a signal in response to such deflection, whereby, with said package transport unit positioned at said weighing location, the one weighing mandrel may be moved horizontally into the winding tube of a package which is supported by said one support mandrel, and the one weighing mandrel then may be moved vertically to lift the package from the support mandrel, and the weight of the package then may be determined from said deflection signal.

2. The apparatus as defined in claim 1 wherein said one weighing mandrel comprises a cantilevered bar, and said sensing means comprises a strain gauge mounted on said bar.

3. The apparatus as defined in claim 2 wherein said package transport unit comprises a plurality of said support mandrels which are disposed in a horizontally and vertically spaced apart pattern, and said weighing station comprises a plurality of said weighing mandrels which are disposed in a corresponding pattern.

4. The apparatus as defined in claim 3 wherein each of said weighing mandrels is provided with a separate one of said deflection sensing means.

5. The apparatus as defined in claim 1 further comprising a calibration station positioned along said path of travel at a fixed location adjacent said weighing location, said calibration station comprising at least one calibrating weight of known magnitude and having a central bore, means for supporting the one calibrating weight for movement between a withdrawn position and an operative position wherein its central bore is aligned with and opposed to said one weighing mandrel, and such that the one weighing mandrel may be horizontally advanced into the central bore and then vertically moved to lift the calibrating weight and thereby permit the sensing means to be calibrated.

6. The apparatus as defined in claim 5 wherein said calibration station is horizontally aligned with said weighing station, with said weighing station being located on one side of said path of travel and the calibration station being located on the other side of said path of travel.

7. The apparatus as defined in claim 1 wherein said one support mandrel is of a generally U-shaped configuration when viewed in transverse cross section.

8. The apparatus as defined in claim 7 wherein said one weighing mandrel is of a generally U-shaped configuration when viewed in transverse cross section and is sized to be received within said one support mandrel.

9. The apparatus as defined in claim 1 wherein said trackway comprises an overhead conveyor, and said package transport unit includes a hanger which is dependingly supported from said conveyor.

10. The apparatus as defined in claim 9 wherein said retaining means for said package transport unit comprises stop means for selectively engaging said hanger.

11. The apparatus as defined in claim 9 wherein said retaining means for said package transport unit comprises means for lifting said hanger from said conveyor and into contact with a fixed guide.

12. A method for weighing packages which comprise a hollow winding tube having a material wound thereupon, and comprising the steps of positioning a package so as to be supported on a horizontally disposed support mandrel which is received in one end of the winding tube of the package, moving the support mandrel and supported package along a path of travel and to a weighing location which is positioned along said path of travel, horizontally advancing a weighing mandrel into the opposite end of the winding tube and then elevating the weighing mandrel so as to lift the package from the support mandrel, sensing the deflection of the weighing mandrel caused by the weight of the package and generating an output signal in response thereto, and processing the output signal so as to determine the weight of the package.

13. The method as defined in claim 12 comprising the further subsequent steps of lowering the weighing mandrel so that the package is again supported by said support mandrel and then horizontally withdrawing the weighing mandrel from the winding tube, moving the support mandrel and supported package to a further location along the path of travel, and repeating the above steps with another package.

14. The method as defined in claim 13 comprising the further step of periodically or randomly placing a weight of known magnitude on said weighing mandrel and sensing the deflection of the weighing mandrel caused by the weight and generating an output signal responsive thereto, and calibrating the weighing process by correcting for any discrepancy between the output signal and the weight of known magnitude.

* * * * *